March 9, 1926.
H. J. ALTNOW
JOINT
Filed April 13, 1925
1,575,730
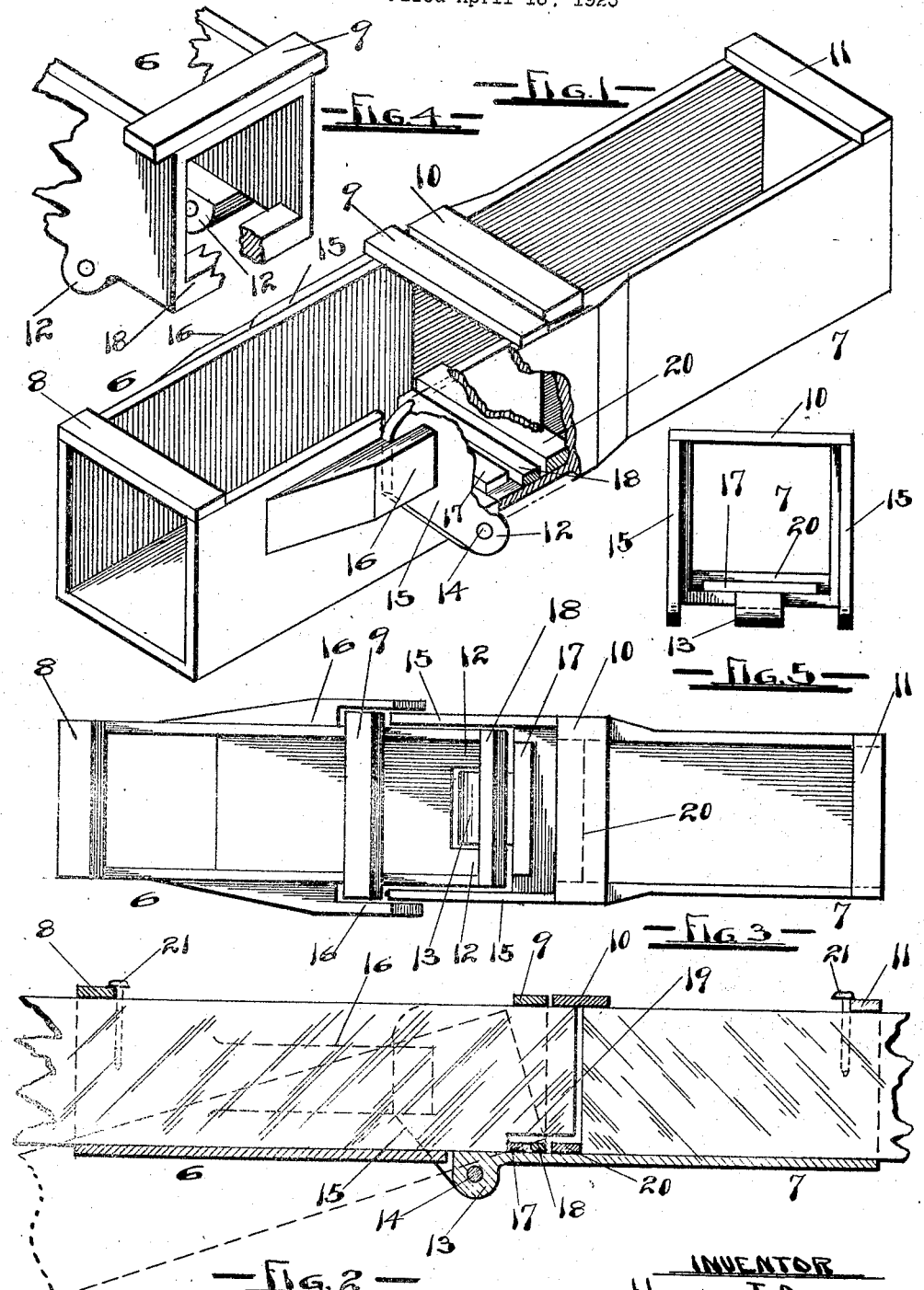
INVENTOR
HENRY J. ALTNOW
BY C.J. Blake
ATTY.

Patented Mar. 9, 1926.

1,575,730

UNITED STATES PATENT OFFICE.

HENRY J. ALTNOW, OF PORTLAND, OREGON.

JOINT.

Application filed April 13, 1925. Serial No. 22,899.

*To all whom it may concern:*

Be it known that I, HENRY J. ALTNOW, a citizen of the United States, residing at Portland, county of Multnomah, State of Oregon, have invented certain new and useful Improvements in Joints, of which the following is a specification.

My invention relates to joints in general, and particularly to joints adapted for joining tent rods, flag poles, and the like, the object being to provide a stiff rigid folding joint device that is unyielding in all directions, easily applied to the pole, and simple and cheap to manufacture. I accomplish this object by means of the construction illustrated in the accompanying drawing, which is a part of this application for Letters Patent, like characters of reference indicating like parts throughout the several views thereof, and in which:

Fig. 1 is a perspective view of my device, parts being broken away to illustrate the construction.

Fig. 2 is a sectional elevation.

Fig. 3 is a plan view, with the joint partly unfolded as shown in the dotted lines of Fig. 2.

Fig. 4 is a fragmentary perspective view of the end of one of the members.

Fig. 5 is an end view of the other member.

In general my device consists of two members pivotally joined, and of box shape to receive the poles; interlocking parts upon said members to relieve the pivot of strain; and means for locking against the pivotal action by the insertion of one pole.

The members 6 and 7 are of box like form preferably open at the top, the sides being connected across the top at each end by cross ties 8, 9, 10 and 11. Upon the bottom of each member are hinge lugs 12 and 13 to receive the pivot 14. Extension side wings 15 are provided upon member 7 adapted to lie upon the sides of member 6 when the two members are in alinement as shown in Fig. 1, and hooks 16 are provided upon member 6 to engage with said wings and thus to stiffen the device against side strains.

Upon the bottom of member 7, and within the same, is disposed a cross bar 17, which cross bar is slightly shorter than the width of the member 7, thus leaving a space at each end thereof between the end of the cross bar and the side of member 7, which space receives the sides of the member 6 when the members are alined as shown in Fig. 1. A cross bar 18 is disposed upon the pivoted end of member 6, and upon the bottom thereof. When the members are thus alined said cross bar 18 lies upon the side of cross bar 17 opposite the pivot hinge, and thus takes any end strain from said hinge by engaging with cross bar 17.

The poles to be joined are shaped to fit into the members 6 and 7, and the pole fitted into member 6 is notched at the end as shown at 19 in Fig. 2 to allow the end of the pole to pass over the cross bars 17 and 18 and extend beneath the cross tie 10 of member 7, as shown also in Fig. 2. This forms a lock to prevent the opening of the joint when in use.

A cross bar 20 upon the bottom of member 7, and within the same beneath the cross tie 10 forms an abutment to limit the insertion of the pole into member 7, as shown in Fig. 2.

When the joint is open and the poles inserted within the members 6 and 7, said poles may be secured therein by nails 21 driven into the poles against the cross ties 8 and 11, as shown in Fig. 2.

My device may be made of any size, and constructed of any materials deemed convenient and suitable for a device of this character, and while I have illustrated and described a form of construction and arrangement of parts found desirable in materializing my invention, I wish to include in this application for Letters Patent all mechanical equivalents and substitutes that may fairly be considered to come within the scope and purview of my invention as defined in appended claims.

Having disclosed my invention so that others may be enabled to construct and to use the same, what I claim as new, and desire to secure by Letters Patent is:

1. In a joint: a pair of pivotally connected box-like members; side wings upon one of said members embracing the other of said members therebetween; hooks upon the other of said members adapted to engage said wings; and cross bars upon the adjacent ends of said members adapted to coact to take the end strain.

2. In a joint: a pair of pivotally connected members adapted to receive the ends of poles; and cross ties upon the adjacent ends of said members, one of said cross ties being adapted to engage the end of the pole inserted into the other member.

3. In a joint: a pair of box-like members; a hinge to connect said members; coacting wings and hooks to receive the side strain; coacting cross bars upon said members to receive the longitudinal strain; and a cross tie upon one member adapted to coact with the pole inserted into the opposite member to resist the transverse strain.

In witness whereof I claim the foregoing as my own I hereunto affix my signature at Portland, county of Multnomah, State of Oregon, this 30th day of April 1924.

HENRY J. ALTNOW.